United States Patent
Vijayendra (10) Patent No.: US 12,235,964 B2
(45) Date of Patent: Feb. 25, 2025

(54) SECURE COLLECTION AND COMMUNICATION OF COMPUTING DEVICE WORKING DATA

(71) Applicant: ATI Technologies ULC, Markham (CA)

(72) Inventor: Srinidhi Katte Vijayendra, Markham (CA)

(73) Assignee: ATI Technologies ULC, Markham (CA)

( * ) Notice: Subject to any disclaimer, the term of this patent is extended or adjusted under 35 U.S.C. 154(b) by 529 days.

(21) Appl. No.: 17/098,234

(22) Filed: Nov. 13, 2020

(65) Prior Publication Data

US 2022/0100860 A1  Mar. 31, 2022

Related U.S. Application Data

(60) Provisional application No. 63/083,584, filed on Sep. 25, 2020.

(51) Int. Cl.
*G06F 21/57* (2013.01)
*G06F 8/65* (2018.01)
*G06F 9/48* (2006.01)

(52) U.S. Cl.
CPC .............. *G06F 21/572* (2013.01); *G06F 8/65* (2013.01); *G06F 9/4812* (2013.01); *G06F 2221/033* (2013.01)

(58) Field of Classification Search
CPC ........ G06F 21/572; G06F 8/65; G06F 9/4812; G06F 2221/033
See application file for complete search history.

(56) References Cited

U.S. PATENT DOCUMENTS

| | | |
|---|---|---|
| 11,188,407 B1 * | 11/2021 | Swanson .............. G06F 11/1435 |
| 2003/0007011 A1 | 4/2003 | Nguyen |
| 2003/0163765 A1 | 8/2003 | Eckardt |

(Continued)

OTHER PUBLICATIONS

Windows Server, "Windows Server 2016 And System Center 2016 Telemetry", Technical Overview White Paper, dated May 2016, 12 pages.
Shehata, Amir, "Kernel GDB Live Debugging with KVM", dated Mar. 10, 2020, 2 pages.
redhat.com, "Current Trusted Execution Environment Landscape", https://next.redhat.com/author/axel-simon/, dated Dec. 2, 2019, 9 pages.
KVM, "Windows Guest Debugging",www.linux-kvm.org/index. php?title=WindowsGuestDrivers/GuestDebugging&oldid, dated May 10, 2010, 2 pages.

(Continued)

*Primary Examiner* — Matthew T Henning
(74) *Attorney, Agent, or Firm* — Hickman Becker Bingham Ledesma LLP; Brian Miller (57) ABSTRACT

A secure data recorder provides targeted collection and storage of working data from any subsystem of a computing device. The data recorder gathers and stores device working data based on stored configuration data. The configuration data indicates memory and storage locations on the device from which to gather working data and storage locations at which the data recorder stores the gathered working data. The data recorder operates in a secure execution environment during all of the pre-boot stage of the computing device. The data recorder further allows a user to update the Basic Input/Output System (BIOS) of the computing device based on a firmware image that may be received via the network. The data recorder also facilitates gathering of working data, over time, that may reveal a malfunction of particular hardware configurations and particular software configurations.

33 Claims, 5 Drawing Sheets

(56) References Cited

U.S. PATENT DOCUMENTS

| | | | |
|---|---|---|---|
| 2003/0188227 A1* | 10/2003 | Maison | G06F 11/0763 |
| | | | 714/45 |
| 2003/0021293 A1 | 11/2003 | Neuman | |
| 2004/0267708 A1 | 12/2004 | Rothman | |
| 2007/0061634 A1 | 3/2007 | Marisetty | |
| 2007/0234298 A1* | 10/2007 | Hirai | G06F 11/3466 |
| | | | 717/124 |
| 2008/0120485 A1* | 5/2008 | Rothman | G06F 13/1668 |
| | | | 711/E12.002 |
| 2009/0222700 A1 | 9/2009 | Carter | |
| 2009/0293130 A1* | 11/2009 | Henry | G06F 21/74 |
| | | | 726/26 |
| 2013/0212425 A1* | 8/2013 | Blaine | G06F 11/3648 |
| | | | 714/6.1 |
| 2014/0019985 A1 | 1/2014 | Krajec | |
| 2015/0006962 A1* | 1/2015 | Swanson | G06F 11/0724 |
| | | | 714/38.11 |
| 2018/0107618 A1* | 4/2018 | Hosseinipour | G06F 11/0787 |
| 2018/0314578 A1 | 11/2018 | Kondapi | |
| 2019/0278651 A1* | 9/2019 | Thornley | G06F 11/0787 |
| 2020/0042324 A1 | 2/2020 | Ayolasomyajula | |
| 2020/0158778 A1 | 5/2020 | Peng et al. | |

OTHER PUBLICATIONS

Jatag.com, "JTAG Technologies", dated Oct. 2019, www.jtag.com, 20 pages.

Intel AMT, "Wireless Manageability", https://software.intel.com/sites/manageability/AMT_Implementation, dated 2006-2020, Intel Corporation, 2 pages.

IBM Support, "QRadar: How to use IMM to run a preboot Dynamic System Analysis for non-booting appliances", dated Dec. 2, 2019, 5 pages.

Hildenbrand, David, "Guest Operating System Debugging", Software Engineer Virtualization and Linux Development, dated Aug. 19, 2015, 25 pages.

Abbott, John, "Trusting in the CPU: Getting to the Roots of Security", Pathfinder Report, dated Jun. 2017, 9 pages.

The International Searching Authority, "Search Report" in Application No. PCT/IB2021/058739, dated Dec. 14, 2021, 9 pages.

* cited by examiner

SECURE COLLECTION AND COMMUNICATION OF COMPUTING DEVICE WORKING DATA

BENEFIT CLAIM

This application claims the benefit of Provisional Application 63/083,584, filed Sep. 25, 2020, the entire contents of which is hereby incorporated by reference as if fully set forth herein, under 35 U.S.C. § 119(e).

BACKGROUND

During execution of a computing device, the device produces and stores many types of working data, including data stored to persistent storage, in memory, in hardware registers, etc. Gathering the working data of a computing device, e.g., for purposes of troubleshooting the device, can be a challenge. This is especially true when low-level working data, such as firmware- or hardware-level (such as register-transfer level), working data is required. It is most effective to access the working data of a device using physical access to the device itself. However, it can be expensive and/or difficult go to the site of a target computing device, especially when the device's working data is required by a non-controlling party, such as the manufacturer/vendor of a portion of the system, a third-party that is hired to troubleshoot the system, etc.

Debugging tools that are used to gather low-level working data during device development (such as the Joint Test Access Group (JTAG) interface) are generally disabled or removed in the production stack of the device, and, as such, are not available in deployed systems. It is possible for a developer to remotely access the low-level working data of a device in a remote computing system based on knowledge of the remote system's "signing key" infrastructure, or when the system has an unlocked debug port. However, allowing this kind of access to a computing system opens up significant security vulnerabilities, and, as such, not all clients will provide the needed rights for remotely accessing device working data.

For purposes of remote troubleshooting, a developer may attempt to recreate, in a local system, an issue being experienced on a remote computing device. However, setting up such a test system environment requires significant amounts of time and engineering effort in order to faithfully reproduce the specific issues of the target device, especially when the issues are original equipment manufacturer (OEM) board-specific.

Furthermore, several telemetry/debugging solutions exist, which rely on the deployed system running a specific operating system (OS) or application. These software-based solutions are able to gather working data, from a remote system, that is specific to the required OS or to the required application, but are generally not able to gather low-level data. Furthermore, software-based solutions are only able to gather working data once software is able to be run on a device, i.e., after the OS has been initiated via the initiation sequence of the device after reboot. As such, software-based solutions are not able to gather data during the pre-boot stage of a computing device. Also, software-based solutions do not facilitate firmware updates, which are required to troubleshoot firmware-based issues. Such limitations significantly reduce the utility of software-based telemetry/debugging solutions for many applications of working data, including debugging device firmware.

There are some remote debugging solutions that are implemented at a lower level than software-based solutions, i.e., in firmware or hardware. However, these solutions generally collect a pre-defined set of working data, and users are not able to specify particular desired points of working data to be collected from the target device. Thus, if the required working data is not part of the pre-defined data set collected by such debugging solutions, the developer may need to use a different technique for gathering the required working data. Also, these solutions are generally not able to facilitate firmware updates to aid in troubleshooting firmware issues.

Also, debugging solutions that are implemented at the firmware level generally assume that one or more subsystems of the target computing device are fully-functional (such as a fully-functioning central processing unit), or require the computing device to complete at least a portion of the initialization sequence before being able to gather working data for the device. As such, these solutions are not able to function during at least a portion of the pre-boot stage of the computing device. This can be a significant disadvantage when the purpose of the required working data is to troubleshoot an error that occurs early in the initialization sequence. Also, some such solutions do not allow storing working data for later review.

One technique for collecting working data during the pre-boot stage of a computing device is collecting the information via external hardware, which has access to the working data of the target device. However, working data is collected by the external hardware passively, and is not controllable by a remote party. Furthermore, this system is not capable of targeting specific working data. Instead, the external hardware collects a pre-defined set of working data from the attached target device. Also, this technique does not allow for remote application of firmware updates that would be required to troubleshoot the firmware of the target system.

Thus, there is a need for a better approach for remote gathering of working data that is hardware-agnostic and that allows for targeted collection and storage of working data, facilitates application of firmware updates, and functions during the entire pre-boot stage of the target device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

Embodiments are depicted by way of example, and not by way of limitation, in the figures of the accompanying drawings and in which like reference numerals refer to similar elements.

DETAILED DESCRIPTION

In the following description, for the purposes of explanation, numerous specific details are set forth in order to provide a thorough understanding of the described techniques. It will be apparent, however, to one skilled in the art that the techniques described herein may be practiced without these specific details. In other instances, well-known structures and devices are shown in block diagram form in order to avoid unnecessarily obscuring the described techniques.

Overview

Techniques described herein provide a secure data recorder framework, which allows targeted collection and storage of working data from any subsystem of a computing device. More specifically, a protocol is provided for a data recorder, functioning within a secure execution environment, to configurably gather and store both high- and low-level working data (including software-level, firmware-level, and register-transfer level (RTL) data). The secure data recorder framework described herein is hardware- and software-agnostic in that the framework may be implemented within a secure execution environment on any kind of hardware, where the device runs any kind of software.

A data recorder, according to techniques described herein, gathers and stores working data from a computing device based on stored configuration data. More specifically, the configuration data indicates one or more memory and/or storage locations on the device from which to gather working data. The configuration data further includes one or more storage locations at which the data recorder stores the gathered working data, which may indicate on-device storage, storage that is locally-accessible, and/or storage that is accessible via a network. Thus, by adjusting the configuration data, a user is able to direct the data recorder to gather and store working data according to the particular needs of a given situation.

A secure execution environment on a computing device is used to perform sensitive operations, such as Basic Input/Output System (BIOS) updates, subsystem driver software updates, and performance of the initialization sequence of the computing device. Thus, applications and hardware running within the secure execution environment of a computing device have access to all subsystems of the device, and, accordingly, the data recorder is able to collect data from all subsystems the device. Furthermore, use of the secure execution environment of the target device to gather and store working data ensures secure gathering of the potentially sensitive working data. Also, because the initiation sequence of the computing device is performed within the secure execution environment, techniques described herein are able to gather working data at any point during the pre-boot stage of the device.

Because the data recorder is implemented in a secure execution environment, the data recorder is able to facilitate remote troubleshooting of a computing device ("Active Debug") by allowing remote application of firmware updates without requiring security authorization or debug privileges for the target computing device. Specifically, after gathering and storing working data, the data recorder may allow a user to push, over the network, a new firmware image to the data recorder, which causes the BIOS of the computing device to be updated using the new firmware image. Thus, utilization of the secure data recorder framework allows for debugging a remote system without requiring recreation of the issue in a local test environment and without requiring any physical access to the system.

Furthermore, the data recorder may be used in connection with Debug as a Service (DaaS) to gather telemetry information from particular subsystems of a computing device, which may be used to improve performance of the subsystems. The configuration data for DaaS functionality may be specific to a target subsystem, and indicates under what circumstances working data should be gathered for the target subsystem. Configuration data-based DaaS allows hardware providers to gather working data, over time, that sheds light on the functioning of particular hardware configurations and/or particular software configurations.

Architecture

Figure 1:
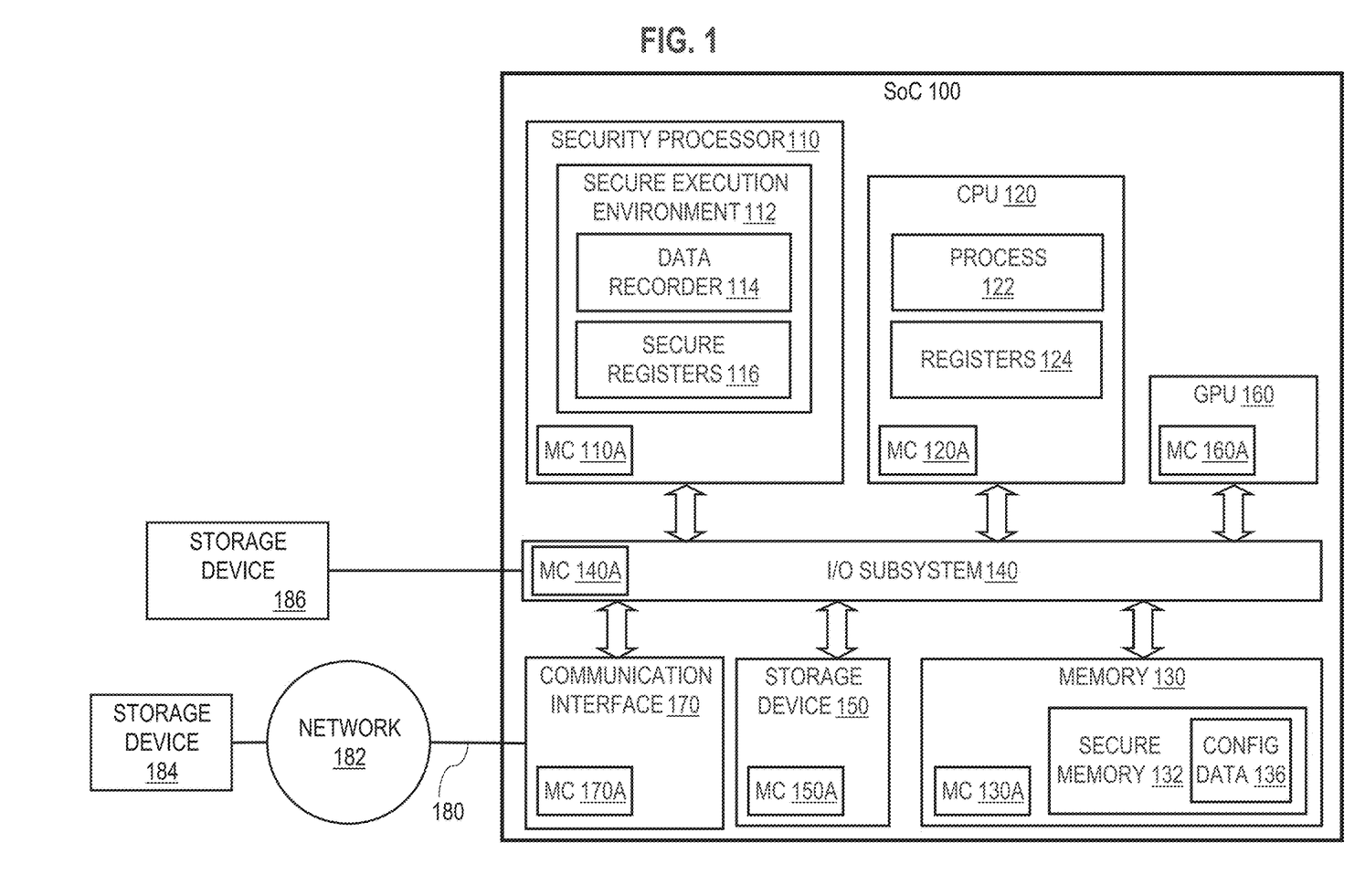
FIG. 1 is a block diagram that depicts an example computing device.

FIG. 1 is a block diagram that depicts an example computing device, i.e., system on a chip (SoC) 100, which implements techniques described herein. Embodiments are described herein in the context of SoC 100. Nevertheless, techniques described herein are applicable to any kind of computing device, including any kind of application-specific integrated circuit (ASIC). SoC 100 is an integrated circuit that comprises an example set of subsystems including: a root-of-trust dedicated security processor 110, a central processing unit (CPU) 120, memory 130, an input/output (I/O) subsystem 140, a persistent storage device 150, a communication interface 170, and peripheral subsystems such as a graphics processing unit (GPU) 160, a camera (not shown in FIG. 1), etc. CPU 120 runs one or more processes, including process 122, that utilize registers 124, which are distinct from secure registers 116. According to an embodiment, CPU 120 runs an OS for SoC 100.

According to an embodiment, one or more subsystems of SoC 100 comprise one or more respective micro-controllers that manage the subsystems. As depicted in FIG. 1, micro-controllers (MCs) 110A-170A respectively control the associated subsystems of SoC 100. These micro-controllers are implemented by drivers installed on SoC 100, where a driver is software or firmware that controls the associated subsystem. SoC 100 may include other subsystems with associated micro-controllers not depicted in FIG. 1.

SoC 100 comprises a security processor 110, distinct from CPU 120, that implements a secure or "trusted" execution environment (SEE) 112. In the embodiment depicted by FIG. 1, the secure execution environment is implemented by a dedicated security processor 110 (or "root of trust" hardware). According to another embodiment, the secure execution environment (e.g., SEE 112) is implemented by a processor that also implements a non-secure execution environment, where the secure execution environment is guaranteed to be secure based on one or more security measures such as a security perimeter, encryption, authentication of software/firmware updates, etc. Examples herein describe SEE 112 being implemented in (and used by) a dedicated security processor 110. However, embodiments are not limited to being implemented by a dedicated security processor, and may be implemented by a processor that maintains both secure and non-secure execution environments.

To illustrate, a CPU maintains both a secure execution environment and a non-secure execution environment, where the CPU runs an OS within the non-secure execution environment. In this example, the CPU has two running states: a secure running state in which an SEE is implemented, and an unsecure running state in which a non-secure (or "rich") execution environment is implemented.

A secure execution environment comprises any process or hardware that uses secure memory and secure registers. A register is a memory location that is reserved for and used by one or more particular processors. Processes and hardware that are part of a secure execution environment are referred to herein as "secure actors". According to an embodiment, instructions that implement operations performed by secure actors are authenticated prior to the operations being performed. Operations being performed by secure actors within a secure execution environment on a given computing device, and data being produced by such operations, are not accessible or changeable by any actor (process or hardware) operating outside of the secure execution environment. Example implementations of secure execution environments include AMD Platform Security Processor (PSP), Intel Software Guard Extensions (SGX), Apple Secure Enclave Processor (SEP), etc.

SEE 112 includes one or more secure actors that utilize secure registers 116 and secure memory 132, which may comprise part or all of memory 130. Secure registers and memory are secured such that only secure actors have access to the data in the secure registers and memory, e.g., because the registers and/or memory are encrypted, or because the registers and/or memory are accessible only by secure actors from within SEE 112, etc.

Secure actors operating within SEE 112 are able to access any working data on SoC 100, including in hardware registers and memory managed by other subsystems, such as registers 124, memory 130, hardware registers of ASICs, etc. The secure actors within SEE 112 access working data within SoC 100 based on security policies, which restrict the access and ensure security within SoC 100.

Secure Data Recorder

Techniques described herein provide a secure data recorder framework, which allows collection and transmission of working data for any subsystem of SoC 100. A data recorder 114, which implements techniques described herein, operates within SEE 112. Accordingly, data recorder 114 may be implemented by the one or more secure actors running on security processor 110 using various approaches that may vary depending on implementation. For example, data recorder 114 may be implemented in firmware, software, and/or hardware, to provide the functionality described herein. Working data is collectible at various levels, including at the software level, the firmware level, and the register-transfer level (RTL).

Because data recorder 114 is implemented within SEE 112, working data may be collected and transmitted while SoC 100 is in any state that allows for functioning of the secure execution environment, including at any point of the pre-boot stage. More specifically, when a computing device, such as SoC 100, shuts down, the subsystems of SoC 100, including CPU 120, enter a reset state. A computing device may be shut down via hardware (a "hard" reset), or via software (a "soft" reset).

Just after a computing device is booted or rebooted, the subsystems of the computing device are still in the reset state. The hardware of the computing device first brings security processor 110 out of reset, and security processor 110 uses secure actors to run through the initialization (or "boot") sequence in the BIOS. For example, security processor 110 first causes the BIOS to be loaded into secure memory 132 and authenticates the BIOS firmware instructions. The BIOS may also include firmware drivers for SoC 100 subsystems, among other things. After authenticating the BIOS, security processor 110 runs the authenticated BIOS firmware, which causes the various subsystems of SoC 100 to be released from the reset state.

After memory 130 and CPU 120 are released from reset state, instructions implementing operating system software are loaded into memory 130 and CPU 120 executes the operating system software. SoC 100 is fully booted up when the operating system software is fully functional. The pre-boot stage of a computing device is the time between (a) the security processor (i.e., the processor that maintains the SEE) being released from the reset state, and (b) the CPU reaching an idle state after being released from the reset state, which idle state usually occurs after initialization of the operating system. During the pre-boot stage, no software (other than operations encoded in the BIOS) is able to be run by the device.

At times, a system that requires debugging is not able to run through the entire boot sequence, which prevents the system from exiting the pre-boot stage. For example, an update to the operating system or firmware of SoC 100 is performed. After performing the update, because of one or more problems with the update, SoC 100 is not able to complete the boot sequence to fully initialize the device subsystems. In such cases, it is important to be able to debug issues with the computing device during the pre-boot stage.

Data Gathering for Active Debug

Figure 2:
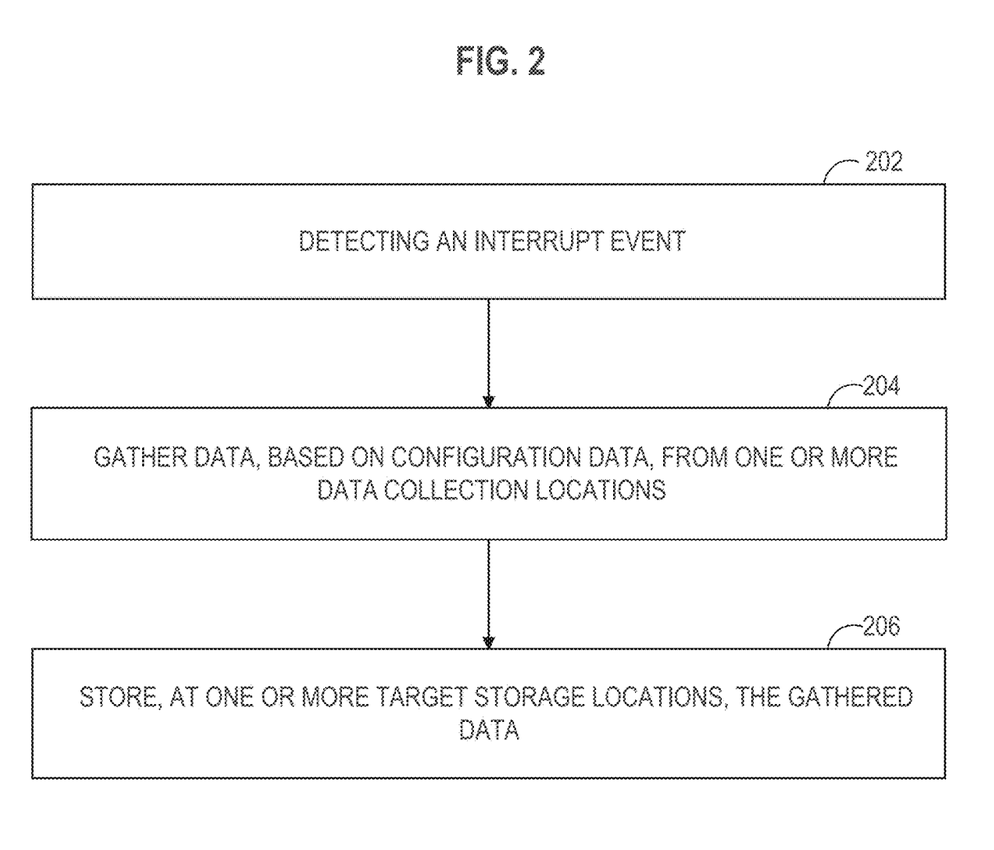
FIG. 2 depicts a flowchart for securely gathering and storing targeted working data for a computing device and based on configuration information.

FIG. 2 depicts a flowchart 200 for securely gathering and storing targeted working data for a computing device and based on configuration information. The process depicted in FIG. 2 addresses the technical problem of how to gather and store working data for a computing device at any stage of the initialization sequence, and at any data level. The technical solution utilizes a secure execution environment, which is also used to initialize the other subsystems on the device, and which has access to data for all subsystems of the device, to run a data recorder that is initiated on-demand.

At step 202 of flowchart 200, an interrupt event is detected. For example, data recorder 114 detects an interrupt event that is one of: an interrupt signal caused by a subsystem of SoC 100, or an interrupt protocol initiated by security processor 110 to address security processor errors. An interrupt signal caused by a subsystem of SoC 100 may be initiated based on the subsystem detecting an error (as with Active Debug). Such an interrupt signal is referred to herein as an "Active Debug-type" interrupt signal. Further, an interrupt signal caused by a subsystem of SoC 100 may be initiated based on detection of a data-gathering condition defined in subsystem-specific configuration data (as with DaaS). Such an interrupt signal is referred to herein as an "DaaS-type" interrupt signal. According to an embodiment, detection of a data-gathering condition may be performed by processor 110. In this embodiment, in response to detecting the data-gathering condition, processor 110 initiates an interrupt protocol in order to initiate a secure data gathering operation.

According to an embodiment, data recorder 114 distinguishes an Active Debug-type interrupt signal from a DaaS-type interrupt signal. For example, security processor 110 implements a shared interrupt line by which interrupt signals arrive at processor 110. In this example, the shared interrupt line is associated with a memory address or register. In connection with causing a data-collection interrupt signal, the subsystem that causes the data-collection interrupt signal writes information (such as a cookie) at the associated memory address or register to indicate whether the interrupt signal is a data-collection signal, and/or whether the signal is a DaaS-type interrupt signal or an Active Debug-type interrupt signal. As another example, security processor 110 implements one or more dedicated data-collection interrupt lines by which interrupt signals arrive at processor 110. To further illustrate, a first dedicated data-collection interrupt line transmits DaaS-type interrupt signals to processor 110 and a second dedicated data-collection interrupt line transmits Active Debug-type interrupt signals to processor 110.

Flowchart 200 is described in the context of Active Debug. However, the techniques shown in flowchart 200 are also applicable to DaaS, as described in further detail below.

For Active Debug, the micro-controller for any given subsystem is able to detect if the associated subsystem is entering a "bad" state, or a state caused by some kind of error. To illustrate, MC 170A detects that communication interface 170 has experienced an error (or has entered a "bad" state), e.g., based on a watchdog timer for communication interface 170 elapsing or a system management unit detecting an error for communication interface 170. Based on detecting the error, MC 170A automatically sends an interrupt signal to security processor 110 to inform the processor of the need to record working data.

Figure 3:
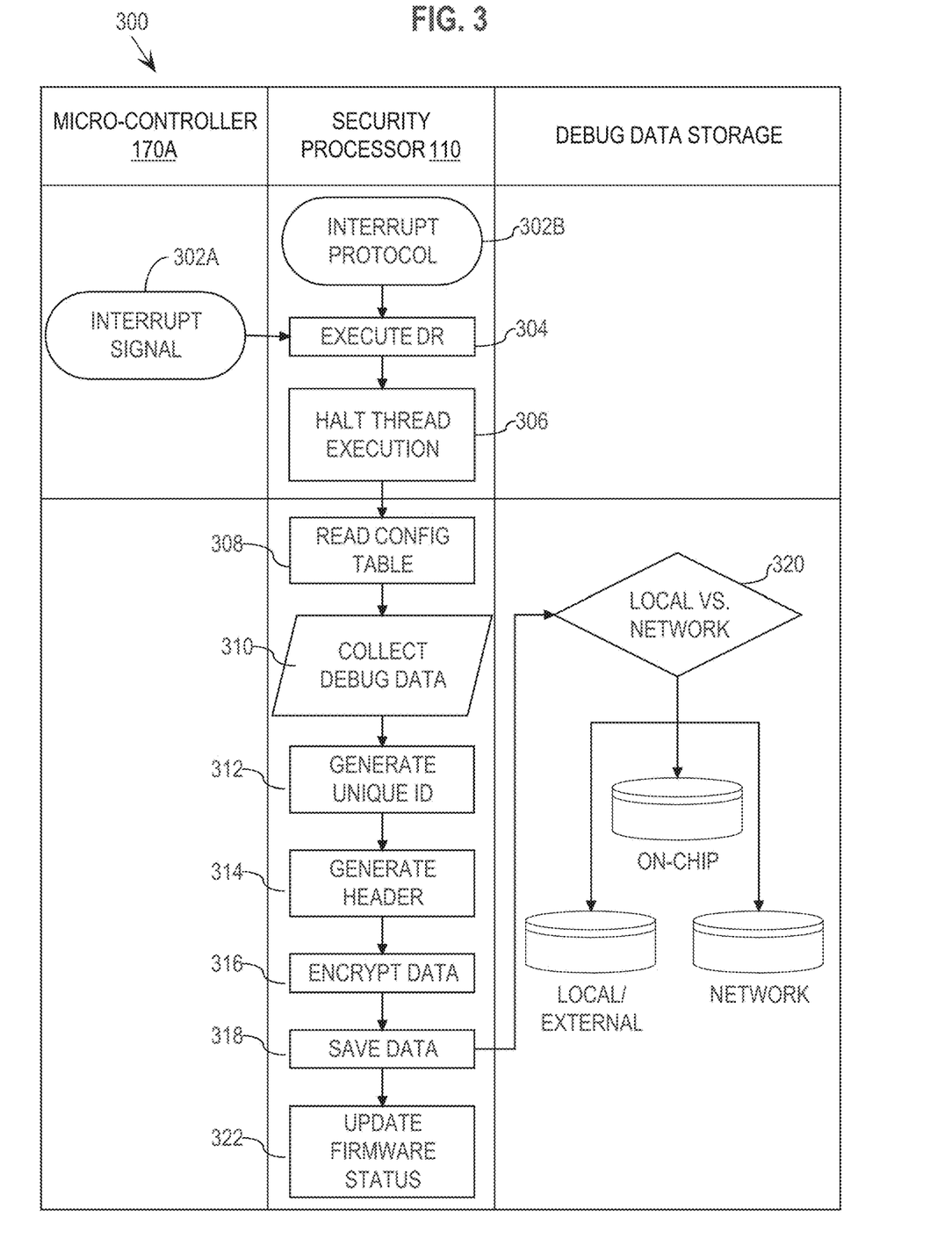
FIG. 3 depicts a more detailed flowchart for an example implementation of securely gathering and storing targeted working data for a target device based on configuration information.

To further illustrate a particular embodiment, FIG. 3 depicts a more detailed flowchart 300 for an example implementation of securely gathering and storing targeted working data for a target device based on configuration information. At step 302A of flowchart 300, the micro-controller of an example subsystem (MC 170A of communication interface 170) of SoC 100 sends a data gathering-type interrupt signal to security processor 110. While communication interface 170 is depicted as a source of the interrupt signal, any subsystem of SoC 100 may be the source of an interrupt signal according to techniques described herein.

Further, as shown at step 302B, execution of data recorder 114 may be initiated based on an interrupt signal that comprises an action by security processor 110 itself. For example, a system management unit for security processor 110 determines that security processor 110 has entered a "bad" state, and causes a self-interrupt protocol to be initiated, which is an example interrupt signal originating from security processor 110.

Configuration Data

Responsive to detecting the interrupt signal, security processor 110 uses data recorder 114, in SEE 112, to perform a data gathering operation that comprises steps 204-206 of flowchart 200. Specifically, at step 204, data is gathered, based on configuration data, from one or more data collection locations. According to an embodiment, one or more data collection locations are identified based on configuration data, where the one or more data collection locations comprise one or more of a hardware register or a memory location. For example, security processor 110 initiates data recorder 114 in response to receiving the interrupt signal from MC 170A. Upon being initiated, data recorder 114 automatically initiates a data gathering operation.

To illustrate in the context of flowchart 300, at step 304, based on the example interrupt signal from MC 170A being of type "data gathering", security processor 110 automatically initiates data recorder 114 ("DR"), e.g., by loading and executing instructions for data recorder 114. Furthermore, at step 306, security processor 110 halts execution of any threads currently being executed by security processor 110. Step 306 may be performed by security processor 110 in response to detecting the interrupt signal, or may be performed by data recorder 114 after being initiated.

At step 308, data recorder 114 reads configuration data 136. According to an embodiment, data recorder 114 reads configuration data 136 from a known location. According to another embodiment, information at a memory location or register associated with an Active Debug-type interrupt signal (i.e., resulting from a subsystem entering a "bad" state) may identify a location of configuration data to be used for the data gathering operation. In the case that the information associated with an interrupt signal does not identify a location of configuration data to be used for the data gathering operation, data recorder 114 reads configuration data 136 at a default location.

According to an embodiment, the default location for configuration data 136 is in the BIOS, which has been loaded into secure memory 132. According to an embodiment, configuration data 136 is encrypted data (e.g., signed binary data), and may be a configuration file that was originally included in the BIOS or may be a file that was included in a BIOS update from a developer who is debugging the system. Nevertheless, the default location for configuration data 136 may be in any memory that is accessible to the secure actors of SEE 112.

According to an embodiment, when data recorder 114 accesses configuration data 136, stored as binary data, data recorder 114 validates a signature of the binary data, and then decrypts the data. The decrypted content is copied to secure memory 132. According to an embodiment, a binary file format of configuration data 136 is generated by a security tool, e.g., run by security processor 110, using a script, which handles input and field validation. Configuration data 136 acts as input, which is used by the one or more instructions that execute on security processor 110. According to an embodiment, configuration data 136 is validated by security processor 110 when the data is loaded, by data recorder 114, e.g., into a serial peripheral interface (SPI)-ROM.

Configuration data 136 indicates one or more locations from which working data should be gathered by data recorder 114, which may be on SoC 100 or may be on a different machine that is accessible to security processor 110. Configuration data 136 may be in any format, including in a user-readable file format such as XML.

Based on configuration data 136, data recorder 114 identifies the target data locations from which to gather working data for a given data gathering operation. According to an embodiment, the one or more target data locations include locations or identifications of one or more hardware registers and/or one or more memory locations. A memory location may specify a location within secure or non-secure memory accessible by data recorder 114. A hardware register may be a register used by a processor on SoC 100 (such as one of secure registers 116 and registers 124) or may be a register that is part of an integrated circuit (such as an ASIC), which holds data at the RTL level. Specifically, a hardware circuit comprises registers for sequential logic, and combinational logic implemented in the hardware. RTL data comprises the flow signals recorded at the hardware registers, which are caused by the functioning of hardware circuitry. RTL data is not accessible by software, which means that this level of data is not available via software-implemented debugging techniques.

Configuration data 136 is used to pass input to data recorder 114 so that the recorder knows what data needs to be captured. This input may be formatted and then parsed by data recorder 114 in a variety of ways. The working data to be gathered, identified in configuration data 136, may be general, or may be specific to the source of the interrupt signal. For example, configuration data 136 identifies locations of working data to record, without respect to the source of an interrupt signal. The locations of working data may be from one or from multiple subsystems of SoC 100. In this example, data recorder 114 gathers the working data at all of the locations identified in configuration data 136. As another example, configuration data 136 identifies locations of one or more subsystem-specific sets of working data to record. In this example, data recorder 114 gathers the working data at the set of data locations, in configuration data 136, that is associated with the subsystem that originated the interrupt signal.

Figure 4:
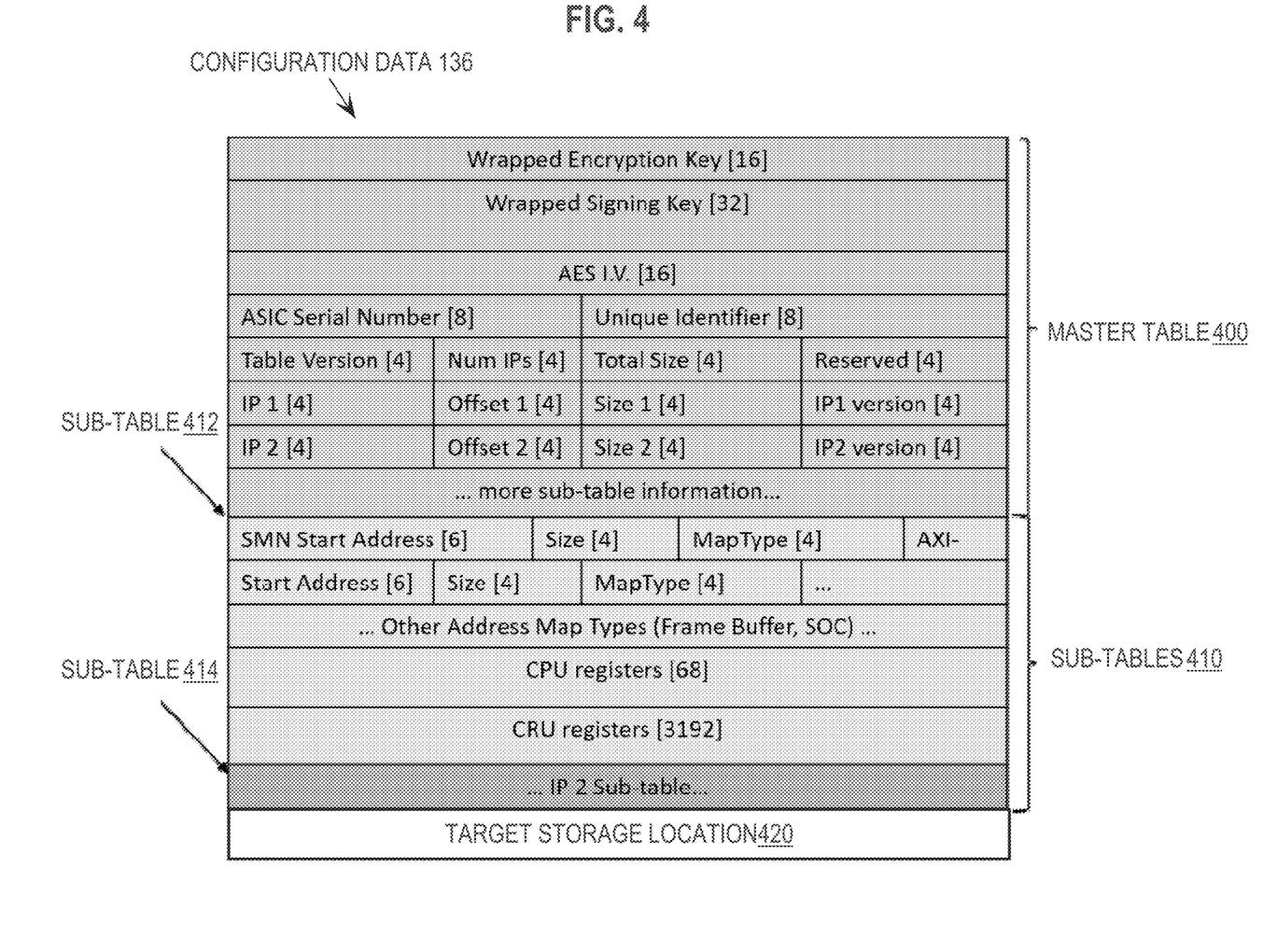
FIG. 4 depicts example configuration data for targeting particular working data.

To illustrate, FIG. 4 depicts example configuration data 136 that indicates both data to be recorded without respect to the source of an interrupt signal and subsystem-specific data. The structure of configuration data 136 in FIG. 4 is illustrative, and configuration data 136 may be structured differently depending on implementation. In the example of FIG. 4, configuration data 136 includes multiple sections: a master table section 400, a sub-tables section 410, and a target storage location data 420. According to an embodiment, when a data gathering operation is initiated, all of the working data identified in master table 400 and in sub-tables 410 of configuration data 136 is gathered by data recorder 114. According to another embodiment, data recorder 114 always gathers the working data identified in master table 400 and then gathers working data identified in one or more sub-tables (of sub-tables 410), e.g., based on the one or more sub-tables being associated with the source of the data collection interrupt signal.

In the example configuration data 136 of FIG. 4, master table section 400 indicates data to be recorded without respect to the source subsystem of an interrupt signal. In this example, master table section 400 includes the following fields, which, according to an embodiment, are used as indicated:

- An ASIC Serial Number that will be used as a seed (parameter) in a key derivation function to derive a wrapping key specific to SoC 100.
- A Wrapped Encryption Key that is a key used to encrypt the configuration data binary contents. The Wrapped Encryption Key is unwrapped using a key derived from the key derivation function.
- A Wrapped Signing Key that is a key used to verify a signature present in the configuration data. The Wrapped Signing Key is unwrapped using a key derived from the key derivation function.
- A Unique Identifier field that is updated with a random value when the configuration data binary is generated. This unique identifier value is included in gathered data by data recorder 114. This unique identifier is used by user to access working data gathered by data recorder 114, e.g., from a network storage device.
- A Table Version, which is a version number that is associated with a format of master table 400. Based on this number, data recorder 114 is able to interpret master table 400.
- Num IPs and total size are numbers that aid in parsing sub-tables 410.

In this example configuration data, sub-tables section 410 includes subsystem-specific sub-tables 412 and 414. The sub-tables in sub-table section 410 include subsystem-specific details for identifying data gathering locations for the subsystem. Sub-tables, in general, contain details of specific sub-systems whose data needs to be gathered. Thus, there will be multiple sub-tables if data for multiple sub-systems needs to be gathered. For example, working data identified in sub-tables 410 (or in master table 400) in configuration data 136 could be located in one or more of: a CPU register, a generic shared register, I/O memory, DRAM/SRAM memory, or Graphics/Video memory, etc. Each sub-table can have one or more fields indicating different types of data that needs to be gathered. For instance, data could be from CPU register or generic shared register or from a I/O memory, DRAM/SRAM memory or Graphics/Video memory. In FIG. 4, SMN corresponds to I/O memory, and CRU registers are generic registers.

Gathering and Storing the Data

As indicated above, at step 204 of flowchart 200, data is gathered, based on configuration data, from one or more data collection locations. For example, as shown at step 310 of flowchart 300, data recorder 114 reads the data from the data locations identified from configuration data 136. For example, data recorder 114 determines that none of the sub-tables in sub-table section 410 of configuration data 136 are specific to communication interface 170. As such, data recorder 114 gathers working data from a set of locations on SoC 100 identified in master table section 400 of the configuration data.

At step 206 of flowchart 200, the gathered data is stored at one or more target storage locations. For example, data recorder 114 stores the gathered working data at secure memory 132 based on one or more target storage locations identified in configuration data 136. Each target storage location, of the one or more target storage locations, identifies one of: on-device storage, storage that is locally-accessible, and/or storage that is accessible via a network. For example, target storage location data 420 of example configuration data 136 of FIG. 4, indicates one or more target storage locations for a given data gathering operation.

To further illustrate, at step 312 of flowchart 300, data recorder 114 generates a unique identifier for the gathered working data, e.g., based on a hash of the gathered working data. At step 314, a header that includes the unique identifier is also generated for the gathered working data.

At step 316, the gathered working data is encrypted. For example, the gathered working data, as well as the header, is encrypted by security processor 110 based on encryption information in master table section 400 of configuration data 136. As another example, the header is not encrypted, and is stored, unencrypted, with the encrypted working data.

At step 318, the encrypted data is saved to one or more of local/external storage, on-chip storage, or network-based storage devices, as indicated by target storage location data 420. Step 320 depicts the decision of where to store the gathered working data, e.g., based on configuration data 136.

Some ASICs have on-chip storage which can be accessed by root-of-trust hardware. For example, based on configuration data 136, data recorder 114 stores the collected data in secure memory 132, which is storage that is on SoC 100. As another example, data recorder 114 stores the collected data as encrypted data within a dedicated, encrypted partition of storage device 150. Similarly, based on configuration data 136, data recorder 114 may store the gathered working data at storage device 186 which, for example, is a flash drive that is communicatively connected to SoC 100 via a USB port.

The configuration file may indicate that the gathered working data should be stored at a remote storage device 184 accessible via network 182. To store data over network 182, data recorder 114 establishes a secure connection to storage device 184. According to an embodiment, target storage location information that identifies storage device 184 includes data required to connect to the network location of storage device 184. This secure connection may be established during the pre-boot stage of the computing device (as long as communication interface 170 has been initialized during the boot sequence) because the firmware of security processor 110 is configured to establish secure network connections without requiring operating system functionality. Once the connection is established, the connection is used to securely transmit the data to storage device 184.

At step 322, a firmware status is updated. For example, security processor 110 includes a status register, which, when data recorder 114 is initiated at step 304, is updated to a first pre-determined value that indicates that data gathering has been initiated. Upon completion of storing the gathered working data based on instructions from configuration data 136, the status register of security processor 110 is again updated to indicate completion of data gathering. The updated value of the status register may be any pre-determined value, different than the first pre-determined value, to indicate completion of the data gathering operation.

Users can retrieve wanted data by providing the ASIC serial number and the unique identifier for the gathered working data, which is included in configuration data 136 as described above. For network-based storage, date and time information act as additional parameter to distinguish data. According to an embodiment, post-processing can only be done by an authorized user and only if captured data is not tampered.

Active Debug

According to an embodiment, after gathering and storing the working data for a given data gathering operation, data recorder 114 waits for input that comprises a new firmware image. According to an embodiment, data recorder 114 only accepts new firmware input for certain kinds of interrupt signals, which are associated with Active Debug. Information associated with an interrupt signal may be used to distinguish such interrupt signals from DaaS-based interrupt signals described in further detail below. For example, configuration data 136 includes a boolean field that indicates whether a firmware update is expected. This field is, by default, set to true.

Figure 5:
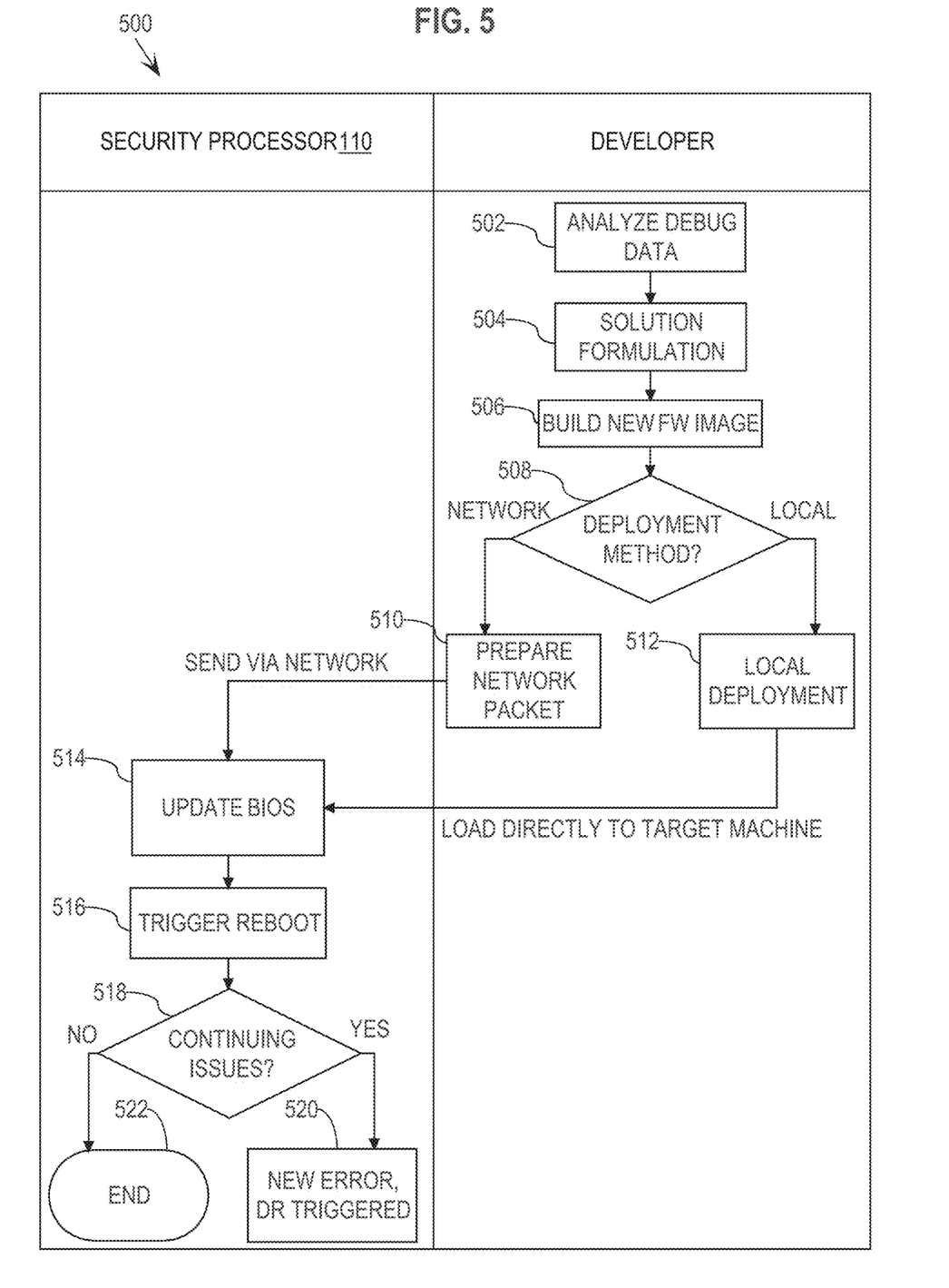
FIG. 5 depicts a flowchart for performing Active Debug by accepting firmware update information and applying the firmware update information to update the firmware of the computing device.

Data recorder 114 waiting for input that comprises a new firmware image allows a developer to push a new firmware image to data recorder 114, which causes security processor to apply the new firmware image to SoC 100. FIG. 5 depicts a flowchart 500 for performing Active Debug by accepting firmware update information and applying the firmware update information to update the firmware of the computing device.

At step 502, the working data is analyzed. To illustrate, SoC 100 experiences the error with communication interface 170, and gathers working data as described above in connection with flowcharts 200 and 300. Based on data in configuration data 136, which indicates that the gathered working data should be stored to storage device 150 (on-chip), data recorder 114 stores the gathered working data to storage device 150 using the determined header. A developer identifies the data in storage device 150 based on the unique identifier recorded in configuration data 136.

The developer analyzes the retrieved working data. For example, one or more post-processing tools may be used to convert the gathered working data to debugger-readable data. Specifically, configuration data 136 identifies set of data that can be used to reproduce a crash scenario, and the developer inputs the gathered working data into a post-processing tool that generates the reproduction.

At step 504 of flowchart 500, the developer formulates a solution based on the gathered working data from the device. For example, based on the working data, the developer formulates one or both of: a firmware update to address the issue, and/or an additional set of working data that would further aid in debugging the issue. To illustrate, the developer determines that (a) a particular change to the firmware of SoC 100 may fix the issue, and (b) information from particular registers of SoC 100 and data from a particular memory area in memory 130 would be helpful to debug SoC 100 if the fix is unsuccessful.

At step 506, the developer builds a new firmware image. For example, the developer encodes, in a new firmware image for SoC 100, both the particular change to the firmware that may fix the issue identified in connection with step 504 and new configuration data 136 that indicates the locations of the identified registers of SoC 100 and the identified memory area in memory 130.

According to an embodiment, new firmware information may be accepted, by data recorder 114, via a network or via a local connection. Thus, at step 508, the developer determines which deployment method to use to push the firmware image to data recorder 114, depending on whether the developer has local access to the device. If the developer is local to SoC 100, then at step 512, the developer deploys the new firmware image locally, e.g., via storage device 186 that is communicatively coupled to SoC 100, e.g., through a USB port.

If the developer is remote from SoC 100, at step 510, a network packet with the new firmware image is prepared and sent via network 182. According to an embodiment, the network packet is sent from a client device, via a secure network connection over network 182, to SoC 100.

According to an embodiment, a new firmware image that is sent through network 182 is saved in a temporary location within SoC 100 (e.g., in secure memory 132) in order to authenticate the firmware image. For example, security processor 110 checks the type of the new firmware image, where the type indicates what subsystem the firmware is designed to run for (e.g., power management firmware, security firmware, video firmware, etc.). If the existing firmware is corrupt, or if the size of the new firmware is less than or equal to the size of the existing firmware, then the new firmware is installed to SoC 100. Otherwise, security processor 110 throws an error and a new firmware image must be created for another attempt at firmware update.

At step 514, data recorder 114 updates the BIOS based on the new firmware image. This update puts into place the new configuration data 136 that was prepared by the developer, as well as the potential fix to the problem. At step 516, security processor 110 causes SoC 100 to reboot, which may be a cold boot or a warm reset. Rebooting the device finalizes installation of the new firmware in that the newly updated firmware image is loaded while booting SoC 100.

After rebooting, at step 518, if all issues are not fixed by the new firmware, then at step 520, the one or more remaining issues cause security processor 110 to execute data recorder 114 again, as shown at steps 302-304 of flowchart 300 (FIG. 3). Subsequent working data collected by data recorder 114 will be based on the new configuration data in the firmware image. However, if all issues are resolved after installing the new firmware, then the process ends at step 522.

Debug as a Service

It can be very useful to gather telemetry information from particular subsystems of a device over time, which can be used to improve performance of the subsystem. For example, some graphic drivers provide high-end graphics capabilities for certain systems, such as 3D graphics systems, computer-aided design systems, and gaming systems. Improvement to the performance of such drivers provides practical and business advantages to both clients and hardware providers.

Using configuration-based data gathering techniques described herein, DaaS allows hardware providers to target data gathering to particular configurations and/or particular software configurations. The data collected with DaaS techniques can be sent to a particular network-based storage device and handled as a Big Data database, with analytics performed on the database to identify updates to be made on the various device subsystems, such as the graphics driver of a particular GPU version, etc.

For DaaS, data recorder 114 is initiated without subsystem error. Specifically, the micro-controller of a subsystem that implements DaaS is associated with subsystem-specific configuration data that defines what data to capture and when to initiate execution of data recorder 114 for the subsystem. The subsystem-specific configuration data allows developers to initiate data gathering at any time, on demand. According to an embodiment, subsystem-specific configuration files are stored in the production stacks of the respective micro-controllers that control the subsystems. For example, a configuration file included in the production stack of a video driver for GPU 160 indicates that the gathered working data should include the load on GPU 160, and the voltage for GPU 160, FW version, frame buffer, performance counters, etc.

The subsystem-specific configuration files may be specific to the hardware configuration and/or use case of the device. For example, a particular subsystem is associated with multiple configuration files that are associated with use case identifiers. Based on the use case information for a given device, one of the configuration files is selected to be the active configuration file.

According to an embodiment, the micro-controller of a subsystem that implements DaaS causes information that identifies particular types of working data to be gathered, from the subsystem-specific configuration file, to be appended to configuration data 136 as a sub-table. In this embodiment, when an interrupt event caused by the subsystem of SoC 100 (which may be any sub-system including security processor 110) is detected, the subsystem-specific information in the sub-table will be gathered by data recorder 114.

A subsystem-specific configuration file further indicates under what circumstances a data gathering-type interrupt signal should be sent to security processor 110, as described above. Upon starting up, a micro-controller of a subsystem determines, based on a subsystem-specific configuration file in the production stack, what conditions should cause a data gathering operation. For example, a configuration file associated with GPU 160 indicates that data recorder 114 should gather subsystem-specific performance data when the load on GPU 160 passes a pre-defined threshold. The micro-controller sets up a listener process to detect when the indicated one or more conditions are true. When the listener detects a data gathering condition, the listener sends a data gathering-type interrupt signal to security processor 110.

A DaaS-type interrupt signal is distinguished from an Active Debug-type interrupt signal in at least one of the ways indicated above. For example, configuration data 136 includes a boolean field that indicates whether a firmware update is expected. Before a DaaS-type interrupt signal is sent to security processor 110, this field is set to false. In an embodiment where the information associated with an interrupt signal includes location information for the subsystem-specific configuration file, data recorder 114 reads the configuration file that is specific to the source of the interrupt signal instead of using configuration data 136. In the embodiment where the interrupt signal is distinguished as for DaaS in another way, data recorder 114 uses the subsystem-specific sub-table appended to configuration data 136 to gather subsystem-specific working data.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be any computing device, such as an SoC or other computing system, that incorporates hard-wired and/or program logic to implement the techniques.

As indicated above, FIG. 1 is an example block diagram that illustrates a SoC 100 upon which an embodiment may be implemented. SoC 100 includes an I/O subsystem ("bus") 140 or other communication mechanism for communicating information, and a hardware processor, CPU 120, coupled with bus 140 for processing information. In the example of FIG. 1, CPU 120 is a general purpose microprocessor.

SoC 100 also includes memory 130, such as a random access memory (RAM) or other dynamic storage device, coupled to bus 140 for storing information and instructions to be executed by processors on SoC 100, such as CPU 120, security processor 110, GPU 160, etc. Memory 130 also may be used for storing temporary variables or other intermediate information during execution of instructions by a processor on SoC 100. Such instructions, when stored in non-transitory storage media accessible to CPU 120, render SoC 100 into a special-purpose machine that is customized to perform the operations specified in the instructions. A storage device 150, such as a magnetic disk, optical disk, or solid-state drive is provided and coupled to bus 140 for storing information and instructions. SoC 100 may also include a read only memory (ROM) (not depicted in FIG. 1) or other static storage device coupled to bus 140 for storing static information and instructions for one or more processors on SoC 100.

SoC 100 may implement the techniques described herein using customized hard-wired logic, one or more ASICs or FPGAs, firmware and/or program logic, which in combination with the computer system causes or programs SoC 100 to be a special-purpose machine. According to one embodiment, the techniques herein are performed by SoC 100 in response to CPU 120 executing one or more sequences of one or more instructions contained in memory 130. Such instructions may be read into memory 130 from another storage medium, such as storage device 150. Execution of the sequences of instructions contained in memory 130 causes CPU 120 to perform the process steps described herein. In alternative embodiments, hard-wired circuitry may be used in place of or in combination with software instructions. In FIG. 1, SoC 100 is also coupled, via bus 140 to an external, locally-accessible, storage device 186 that comprises storage media.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 150. Volatile media includes dynamic memory, such as memory 130. Common forms of storage media include, for example, hard disk, solid-state drive, magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 140. Transmission media can also take the form of acoustic or light waves, such as those generated during radio-wave and infra-red data communications.

Various forms of media may be involved in carrying one or more sequences of one or more instructions to CPU 120 for execution. For example, the instructions may initially be carried on a magnetic disk or solid-state drive of a remote computer. The remote computer can load the instructions into its dynamic memory and send the instructions over a network. A communication interface 170 of SoC 100 can receive the data from the network and appropriate circuitry can place the data on bus 140. Bus 140 carries the data to memory 130, from which CPU 120 retrieves and executes the instructions. The instructions received by memory 130 may optionally be stored on storage device 150 either before or after execution by CPU 120.

Communication interface 170 of SoC 100 is coupled to bus 140, and provides a two-way data communication coupling to a network link 180 that is connected to a local network 182. For example, communication interface 170 may be a local area network (LAN) card to provide a data communication connection to a compatible LAN. Wireless links may also be implemented. In any such implementation, communication interface 170 sends and receives electrical, electromagnetic, or optical signals that carry digital data streams representing various types of information.

Network link 180 typically provides data communication through one or more networks to other data devices. For example, network link 180 may provide a connection through a network 182 to storage device 184. Network 182 uses electrical, electromagnetic, or optical signals that carry digital data streams. The signals through the various networks and the signals on network link 180 and through communication interface 170, which carry the digital data to and from SoC 100, are example forms of transmission media.

SoC 100 can send messages and receive data, including program code, through the network(s), network link 180 and communication interface 170. For example, an external computing device (not depicted in FIG. 1) might transmit, to SoC 100, a firmware update for security processor 110 through network 182 and communication interface 170. The received code may be executed by SoC 100 as it is received, and/or stored in storage device 150, or other non-volatile storage for later execution.

The invention claimed is:

1. A computer-executable method comprising:
applying firmware update information that indicates: a) one or more data collection locations, including a secure register in a hardware processor and at least one data collection location in a random access memory (RAM), and b) one or more target storage locations;
responsive to an interrupt event, using, by a processor of a computing device, a secure execution environment to perform a data gathering operation that comprises:
gathering data, from the one or more data collection locations including the secure register in a hardware processor and the at least one data collection location in the RAM; and
storing, at the one or more target storage locations, the gathered data.

2. The computer-executable method of claim 1, wherein the interrupt event is associated with information that associates the interrupt event with the data gathering operation.

3. The computer-executable method of claim 1, further comprising detecting, by the processor during a pre-boot stage of the computing device, the interrupt event.

4. The computer-executable method of claim 1, wherein a target storage location, of the one or more target storage locations, identifies
a storage device that is accessible via a network.

5. The computer-executable method of claim 1 further comprising:
detecting, by the processor while one or more threads are being executed by the processor, the interrupt event; and
responsive to detecting the interrupt event, ceasing execution of the one or more threads.

6. The computer-executable method of claim 1, wherein the RAM is video memory.

7. The computer-executable method of claim 1, wherein:
the interrupt event is associated with a location of configuration data in a production stack of a particular subsystem of the computing device;
the one or more data collection locations are associated with the particular subsystem; and
the method further comprises retrieving the configuration data from the location.

8. The computer-executable method of claim 1, further comprising generating a unique identifier for the gathered data, wherein the gathered data is stored in connection with the unique identifier.

9. The computer-executable method of claim 1, wherein a basic input/output system (BIOS) update contains the firmware update information that indicates the one or more data collection locations and the one or more target storage locations.

10. The computer-executable method of claim 1, wherein:
the computing device is an integrated circuit;
the processor is a dedicated security processor on the integrated circuit; and
the interrupt event is associated with a microprocessor for a subsystem on the integrated circuit.

11. The computer-executable method of claim 1, wherein a data collection location of the one or more data collection locations is encrypted.

12. A computing system comprising:
one or more processors; and
memory that stores one or more sequences of instructions that, when executed by the one or more processors, cause the one or more processors to:
apply firmware update information that indicates: a) one or more data collection locations, including a secure register in a hardware processor and at least one data collection location in a random access memory (RAM), and b) one or more target storage locations;
responsive to an interrupt event, use a secure execution environment to perform a data gathering operation that comprises:
gathering data, from the one or more data collection locations including the secure register in a hardware processor and the at least one data collection location in the RAM; and
storing, at the one or more target storage locations, the gathered data.

13. The computing system of claim 12, wherein the interrupt event is associated with information that associates the interrupt event with the data gathering operation.

14. The computing system of claim 12, wherein said one or more sequences of instructions further comprise instructions that, when executed by the one or more processors, cause the one or more processors to detect, during a pre-boot stage of the computing system, the interrupt event.

15. The computing system of claim 12, wherein a target storage location, of the one or more target storage locations, identifies
a storage device that is accessible via a network.

16. The computing system of claim 12, wherein the one or more sequences of instructions further comprise instructions that, when executed by the one or more processors, cause the one or more processors to:
detect the interrupt event while one or more threads are being executed by the one or more processors; and
responsive to detecting the interrupt event, cease execution of the one or more threads.

17. The computing system of claim 12, wherein the RAM is video memory.

18. The computing system of claim 12, wherein:
the interrupt event is associated with a location of configuration data in a production stack of a particular subsystem of the computing system;
the one or more data collection locations are associated with the particular subsystem; and
the one or more sequences of instructions further comprise instructions that, when executed by the one or more processors, cause the one or more processors to retrieve the configuration data from the location.

19. The computing system of claim 12, wherein the one or more sequences of instructions further comprise instructions that, when executed by the one or more processors, cause the one or more processors to generate a unique identifier for the gathered data, wherein the gathered data is stored in connection with the unique identifier.

20. The computing system of claim 12, wherein a basic input/output system (BIOS) update contains the firmware update information that indicates the one or more data collection locations and the one or more target storage locations.

21. The computing system of claim 12, wherein:
the computing system is an integrated circuit;
the one or more processors include a dedicated security processor on the integrated circuit; and
the interrupt event is associated with a microprocessor for a subsystem on the integrated circuit.

22. The computing system of claim 12, wherein a data collection location of the one or more data collection locations is encrypted.

23. One or more non-transitory computer-readable media storing one or more sequences of instructions that, when executed by one or more processors, cause the one or more processors to:
apply firmware update information that indicates: a) one or more data collection locations, including a secure register in a hardware processor and at least one data collection location in a random access memory (RAM), and b) one or more target storage locations;
responsive to an interrupt event, use a secure execution environment to perform a data gathering operation that comprises:
gathering data, from the one or more data collection locations including the secure register in a hardware processor and the at least one data collection location in the RAM; and
storing, at the one or more target storage locations, the gathered data.

24. The one or more non-transitory computer-readable media of claim 23, wherein the interrupt event is associated with information that associates the interrupt event with the data gathering operation.

25. The one or more non-transitory computer-readable media of claim 23, wherein said one or more sequences of instructions further comprise instructions that, when executed by the one or more processors, cause the one or more processors to detect, during a pre-boot stage of a computing device, the interrupt event.

26. The one or more non-transitory computer-readable media of claim 23,
wherein a target storage location, of the one or more target storage locations, identifies
a storage device that is accessible via a network.

27. The one or more non-transitory computer-readable media of claim 23, wherein the one or more sequences of instructions further comprise instructions that, when executed by one or more processors, cause the one or more processors to:
detect the interrupt event while one or more threads are being executed by the one or more processors; and
responsive to detecting the interrupt event, cease execution of the one or more threads.

28. The one or more non-transitory computer-readable media of claim 23, wherein the RAM is video memory.

29. The one or more non-transitory computer-readable media of claim 23, wherein:
the interrupt event is associated with a location of configuration data in a production stack of a particular subsystem of a computing device;
the one or more data collection locations are associated with the particular subsystem; and
the one or more sequences of instructions further comprise instructions that, when executed by the one or more processors, cause the one or more processors to retrieve the configuration data from the location.

30. The one or more non-transitory computer-readable media of claim 23, wherein the one or more sequences of instructions further comprise instructions that, when executed by one or more processors, cause the one or more processors to generate a unique identifier for the gathered data, wherein the gathered data is stored in connection with the unique identifier.

31. The one or more non-transitory computer-readable media of claim 23, wherein a basic input/output system (BIOS) update contains the firmware update information that indicates the one or more data collection locations and the one or more target storage locations.

32. The one or more non-transitory computer-readable media of claim 23, wherein:
   the one or more processors include a dedicated security processor on an integrated circuit; and
   the interrupt event is associated with a microprocessor for a subsystem on the integrated circuit.

33. The one or more non-transitory computer-readable media of claim 23, wherein a data collection location of the one or more data collection locations is encrypted.

* * * * *